(12) United States Patent
Schulz et al.

(10) Patent No.: US 9,718,378 B2
(45) Date of Patent: Aug. 1, 2017

(54) VEHICLE SEAT

(75) Inventors: Jens Schulz, Kaiserslauten (DE); Thomas Christoffel, Herschweiler-Pettersheim (DE)

(73) Assignee: Johnson Controls Components GmbH & Co. KG, Kaiserslautern (DE)

( * ) Notice: Subject to any disclaimer, the term of this patent is extended or adjusted under 35 U.S.C. 154(b) by 341 days.

(21) Appl. No.: 14/233,989

(22) PCT Filed: Jun. 30, 2012

(86) PCT No.: PCT/EP2012/002783
§ 371 (c)(1),
(2), (4) Date: Jan. 21, 2014

(87) PCT Pub. No.: WO2013/013759
PCT Pub. Date: Jan. 31, 2013

(65) Prior Publication Data
US 2014/0138997 A1    May 22, 2014

(30) Foreign Application Priority Data
Jul. 22, 2011   (DE) ......................... 10 2011 108 374

(51) Int. Cl.
*B60N 2/07*   (2006.01)
*B60N 2/14*   (2006.01)
(Continued)

(52) U.S. Cl.
CPC ............. *B60N 2/07* (2013.01); *B60N 2/0244* (2013.01); *B60N 2/06* (2013.01); *B60N 2/14* (2013.01)

(58) Field of Classification Search
CPC ........ B60N 2/062; B60N 2/07; B60N 2/0742; B60N 2/0737; B60N 2/0745;
(Continued)

(56) References Cited

U.S. PATENT DOCUMENTS

| | | | | |
|---|---|---|---|---|
| 6,572,172 B1 * | 6/2003 | Ninomiya | ............ | B60N 2/0232 296/65.07 |
| 6,981,746 B2 * | 1/2006 | Chung | ..................... | B60N 2/14 248/425 |

(Continued)

FOREIGN PATENT DOCUMENTS

DE   199 16 091 A1   10/2000
DE   10 2006 035439 A1   5/2007
(Continued)

*Primary Examiner* — David E Allred
(74) *Attorney, Agent, or Firm* — McGlew and Tuttle, P.C.

(57) ABSTRACT

A method is provided for controlling a longitudinally adjustable and rotatable vehicle seat with upper rails guided in lower rails, motors for respectively driving the upper rails and a seat shell. An aligned displacement of the upper rails relative to the lower rails displaces the seat shell in a straight line. A displacement of the first upper rail relative to the second upper rail rotates the seat shell about a vertical axis. An initial position is stored. The seat shell is moved in a straight line out of the initial position into a starting position. From the starting position the seat shell is rotated by a first angle into an intermediate position. The seat shell is moved in a straight line in the direction of travel into a first central position. The seat shell is rotated by a second angle into an end position.

20 Claims, 7 Drawing Sheets

(51) Int. Cl.
*B60N 2/02* (2006.01)
*B60N 2/06* (2006.01)

(58) Field of Classification Search
CPC .. B60N 2/0244; B60N 2/0224; B60N 2/0232; B60N 2002/0236; B60N 2/0252; B60N 2002/0256; B60N 2/06; B60N 2/065; B60N 2/067
USPC ............................ 297/344.1, 344.24, 344.23
See application file for complete search history.

(56) References Cited

U.S. PATENT DOCUMENTS

| | | | | |
|---|---|---|---|---|
| 7,753,444 | B2 * | 7/2010 | Vallentin | B60N 2/2821 297/256.12 |
| 7,845,703 | B2 * | 12/2010 | Panzarella | B60N 2/0232 296/65.11 |
| 8,079,641 | B2 * | 12/2011 | Lung | B60N 2/06 297/344.24 |
| 8,182,014 | B2 * | 5/2012 | Mabuchi | B60N 2/01 296/64 |
| 8,702,169 | B2 * | 4/2014 | Abadilla | B60N 2/062 297/256.12 |
| 9,463,715 | B1 * | 10/2016 | Rawlinson | B60N 2/0248 |
| 2007/0112492 | A1 | 5/2007 | Hyodo et al. | |
| 2007/0246987 | A1 * | 10/2007 | Sano | B60N 2/146 297/344.24 |
| 2013/0221720 | A1 * | 8/2013 | Pluta | B60N 2/06 297/344.1 |
| 2016/0332539 | A1 * | 11/2016 | Rawlinson | B60N 2/0244 |

FOREIGN PATENT DOCUMENTS

| | | | | |
|---|---|---|---|---|
| DE | 102009033494 A1 | * | 1/2011 | ........... B60N 2/0232 |
| DE | 10 2011 108374 A1 | | 1/2013 | |
| EP | 1 772 306 A2 | | 4/2007 | |
| JP | 09156404 A | * | 6/1997 | |
| JP | H09156404 A | | 6/1997 | |
| JP | 2000 052824 A | | 2/2000 | |
| JP | 2006143173 A | * | 6/2006 | ........... B60N 2/4235 |
| JP | 2009149259 A | * | 7/2009 | |
| WO | 2011/006592 A1 | | 1/2011 | |

* cited by examiner

VEHICLE SEAT

CROSS REFERENCE TO RELATED APPLICATIONS

This application is a United States National Phase Application of International Application PCT/EP2012/002783 filed Jun. 30, 2012 and claims the benefit of priority under 35 U.S.C. §119 of German Patent Application DE 10 2011 108 374.3 filed Jul. 22, 2011, the entire contents of which are incorporated herein by reference.

FIELD OF THE INVENTION

The invention relates to a method for controlling a longitudinally adjustable and rotatable vehicle seat which comprises a first upper rail movably guided in a first lower rail, a second upper rail movably guided in a second lower rail, a first motor for driving the first upper rail, a second motor for driving the second upper rail and a seat shell, wherein by means of an aligned displacement of the upper rails relative to the lower rails the seat shell is displaced in a straight line and wherein by means of a displacement of the first upper rail relative to the second upper rail the seat shell undergoes a rotation about a vertical axis.

BACKGROUND OF THE INVENTION

A longitudinally adjustable and rotatable vehicle seat is disclosed in WO 2011/006 592 A1, said vehicle seat comprising a rail system by means of which a seat shell of the vehicle seat is able to be displaced for longitudinal adjustment in the direction of travel as well as counter to the direction of travel. In this case, such a rail system has two lower rails which extend parallel to one another in the direction of travel and which are fastened to the vehicle floor. Two upper rails, which are movably guided in one respective lower rail, jointly bear the seat shell. Electric motors are provided for driving the upper rails.

The seat shell and/or a supporting plate, to which the seat shell is fastened, are rotatably mounted on one of the two upper rails about a vertical axis. By displacing one upper rail relative to the other upper rail, the seat shell undergoes a rotation about said vertical axis. Such a rotation simplifies the entry and exit of an occupant.

Depending on the set longitudinal position of the seat shell, body parts of an occupant may collide with further vehicle parts when said seat shell is rotated. For example, the knees of a driver may collide with the steering wheel or the B-pillar.

A similar vehicle seat is disclosed in JP 09 156 404 A. By a displacement of one upper rail relative to the other upper rail, the seat undergoes a rotation about a vertical axis. Electric motors are provided for the drive.

A method for controlling a vehicle seat is disclosed in JP 2000 052 824 A. In this case, the vehicle seat undergoes a movement predetermined by a corresponding curved track, said movement comprising a rotation about a vertical axis and a linear displacement.

DE 10 2006 035 439 A1 discloses a vehicle access system which, amongst other things, comprises an electronic memory device for storing seat positions.

A device for adjusting interior parts of a vehicle, in particular a steering wheel, is disclosed in DE 199 16 091 A1.

SUMMARY OF THE INVENTION

The object of the invention is to specify a method for controlling a vehicle seat of the type mentioned in the introduction which prevents such collisions of the body parts of an occupant with vehicle parts.

It is provided by the invention that firstly an initial position is stored, then the seat shell is displaced in a straight line from the initial position into a starting position, then the seat shell is rotated by a first angle from the starting position into an intermediate position, then the seat shell is displaced in a straight line in the direction of travel into a first central position and then the seat shell is rotated by a second angle into an end position.

In a movement sequence produced by the method according to the invention, the body parts, in particular the knees, of a driver are prevented from colliding with a steering wheel located in front of the seat shell.

Advantageously, the seat shell is rotated from the first central position by the second angle and at the same time is displaced in a straight line until the end position is reached. By means of such a superimposed movement, the seat shell is guided as closely as possible past a B-pillar of the body of the vehicle, whereby the distance from the steering wheel is maximized.

Provided the steering wheel is provided with an adjusting drive, according to an advantageous embodiment of the invention it is provided that at the same time the steering wheel is moved away from the seat shell in the longitudinal direction and/or upwardly in the vertical direction. As a result, the steering wheel is moved even further away from the knees of the driver.

It has proved particularly advantageous if, during the rotation of the seat shell by the first angle, the steering wheel is moved away from the seat shell in the longitudinal direction and/or upwardly in the vertical direction.

Other drives which are additionally present in the vehicle may also be advantageously incorporated in the invention, for example a door opener or door drive.

The invention is described in more detail hereinafter with reference to advantageous exemplary embodiments shown in the drawings. The invention is, however, not limited to said exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
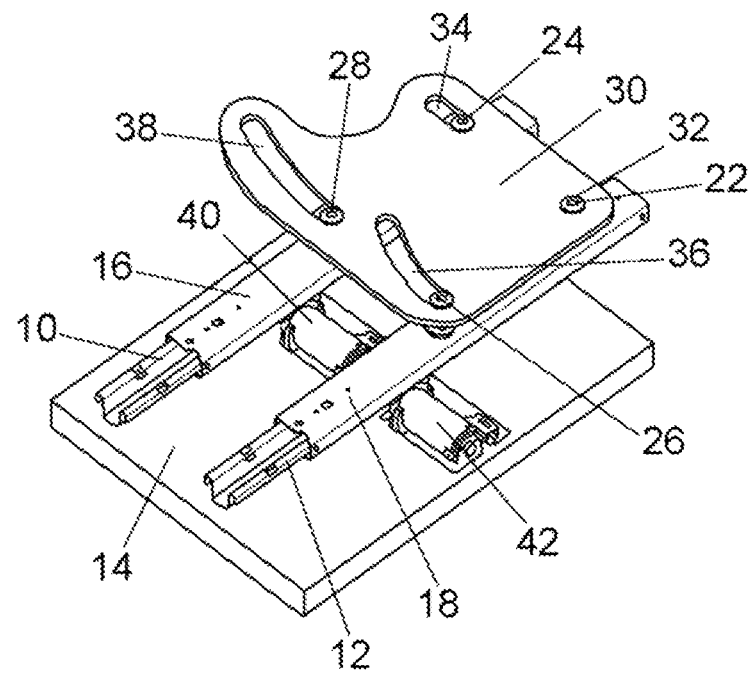
FIG. 1 is a perspective view showing substructure of a known vehicle seat.

Referring to the drawings in particular, a substructure of a known vehicle seat is shown in FIG. 1. A first lower rail 10 and a second lower rail 12 are fastened to a vehicle floor 14 parallel to one another. A first upper rail 16 is movably guided in the first lower rail 10. Also, a second upper rail 18 is movably guided in the second lower rail 12. The direction of movement of the upper rails 16, 18 relative to the lower rails 10, 12 is denoted as the longitudinal direction x.

In this example, the longitudinal direction x extends parallel to the direction of travel. The upper rails 16, 18 are thus displaceable in the direction of travel as well as counter to the direction of travel. It is also conceivable to arrange the lower rails 10, 12 obliquely or inclined relative to the direction of travel. In this case, the upper rails 16, 18 are displaceable in a manner which is oblique or inclined relative to the direction of travel.

Figure 3:
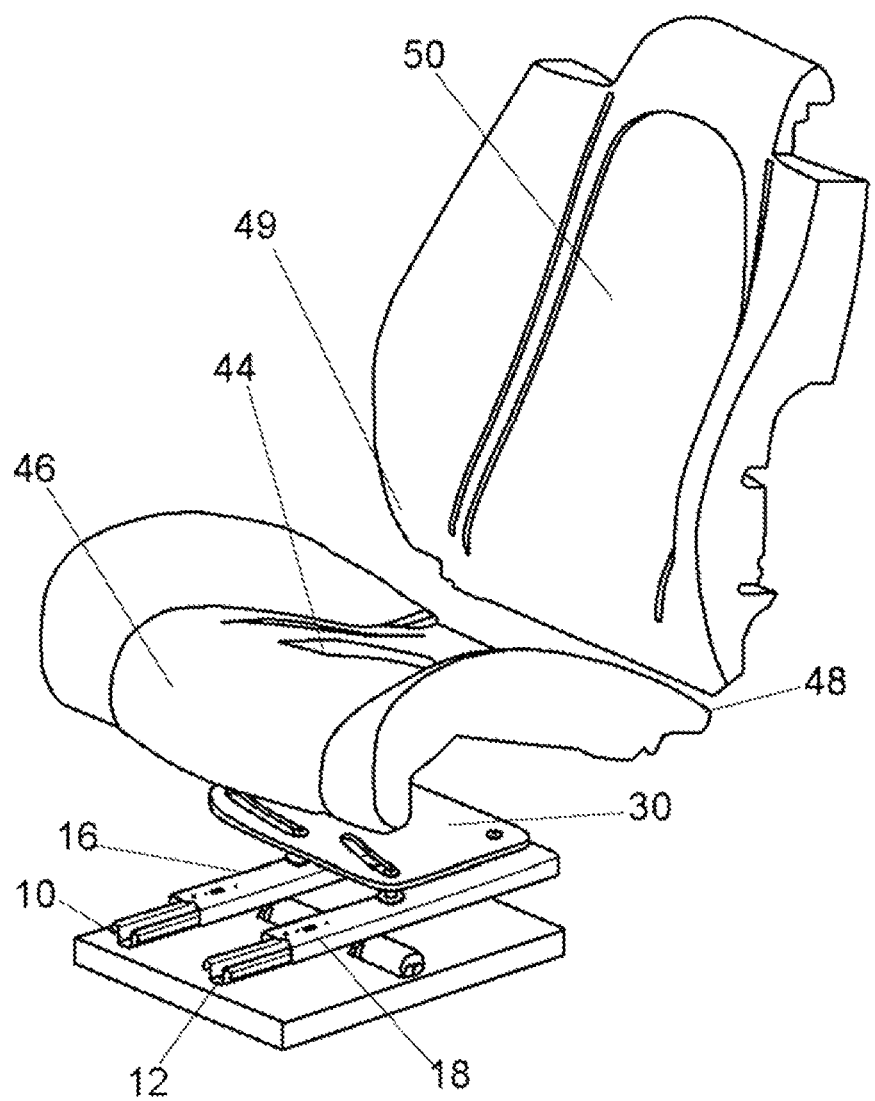
FIG. 3 is a perspective view showing a vehicle seat in the position of use.
Figure 4:
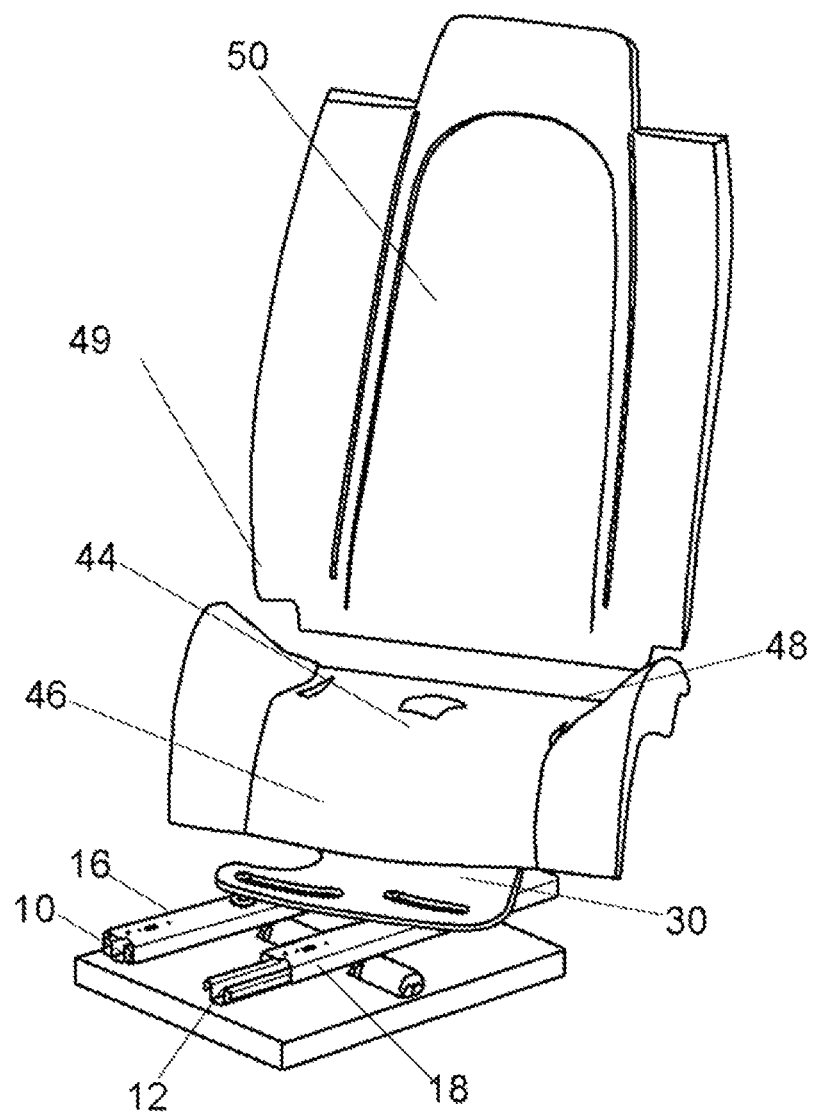
FIG. 4 is a perspective view showing a vehicle seat in the rotated position.

A supporting plate 30 bears against the upper rails 16, 18 and is fastened thereto. A seat shell 49 shown in FIG. 3 and FIG. 4 is mounted on the supporting plate 30. The supporting plate 30 has in this example the shape of a planar plate which extends substantially in the longitudinal direction x and in a direction extending perpendicular thereto and denoted as the transverse direction y.

By the synchronous displacement of the first upper rail 16 and the second upper rail 18 relative to the lower rails 10, 12, the supporting plate 30 undergoes a displacement in the longitudinal direction x.

A direction extending perpendicular to the longitudinal direction x and perpendicular to the transverse direction y is denoted hereinafter as the vertical direction.

The supporting plate 30 has a bore 32 through which a pivot pin 22 fastened to the second upper rail 18 protrudes. The supporting plate 30 is thus mounted rotatably on the second upper rail 18 about the central axis of the pivot pin 22.

The supporting plate 30 further comprises a first recess 34 through which a first pin 24 fastened to the first upper rail 16 protrudes. The first recess 34 has in this example the shape of a straight slot extending in the transverse direction y, having a width corresponding to the diameter of the first pin 24. The first recess 34 may also extend obliquely to the transverse direction y. A different design is also conceivable, for example a curved shape. It is also conceivable that the first recess 34 extends as far as the edge of the supporting plate 30, resulting in an outwardly open fork-shaped arrangement in which the first pin 24 is guided.

The supporting plate 30 also has a second recess 36 through which a second pin 26 fastened to the second upper rail 18 protrudes. The second recess 36 has the shape of a slot in the form of a circular segment, having a width corresponding to the diameter of the second pin 26. The radius of said circular segment corresponds to the distance of the central axis of the pivot pin 22 from the central axis of the second pin 26.

The supporting plate 30 also has a third recess 38 through which a third pin 28 fastened to the first upper rail 16 protrudes. The third recess 38 has the shape of a curved slot, having a width corresponding to the diameter of the third pin 28.

The central axes of the pivot pin 22 and the pins 24, 26, 28 extend parallel to one another in the vertical direction. The recesses 34, 36, 38 are designed so that with a displacement of the first upper rail 16 relative to the second upper rail 18 in the longitudinal direction x, a rotation of the supporting plate 30 is possible about the central axis of the pivot pin 22.

Figure 2:
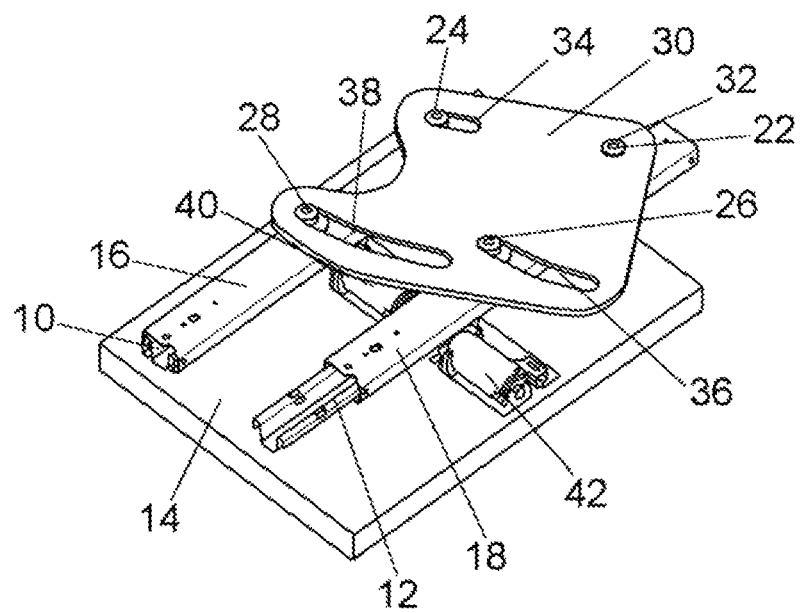
FIG. 2 is a perspective view showing the substructure shown in FIG. 1 with the rotated supporting plate.

A position reached by such a displacement of the first upper rail 16 relative to the second upper rail 18 is shown in FIG. 2. The supporting plate 30 in this case has undergone a rotation relative to the position shown in FIG. 1 about the central axis of the pivot pin 22 extending in the vertical direction.

A first motor 40 is provided for driving the first upper rail 16, said first motor in the present case being arranged in the vehicle floor 14. A second motor 42 is also provided for driving the second upper rail 18, said second motor also being arranged in the vehicle floor 14 in the present case. The motors 40, 42 are, for example, designed as electronically commutated motors or brushed DC motors.

It is also conceivable to arrange the motors 40, 42 at other positions, for example on the vehicle floor 14 or even fixed to the upper rails.

Figure 5:
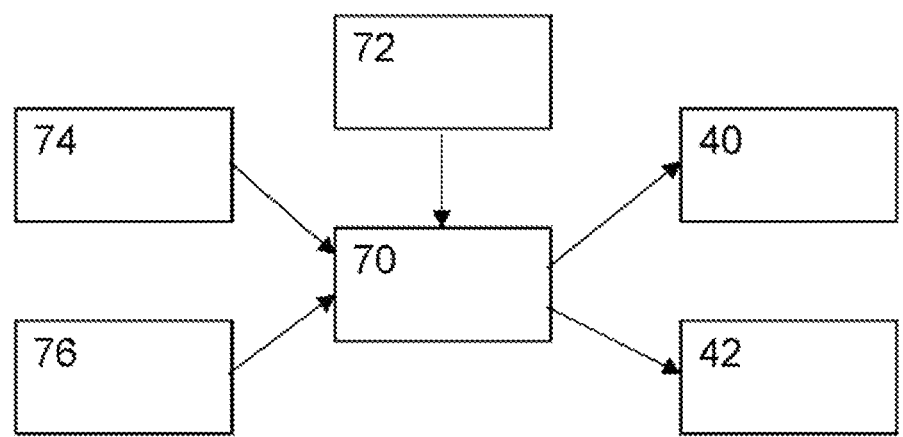
FIG. 5 is a schematic view of a control system for controlling the vehicle seat.
Figure 6:
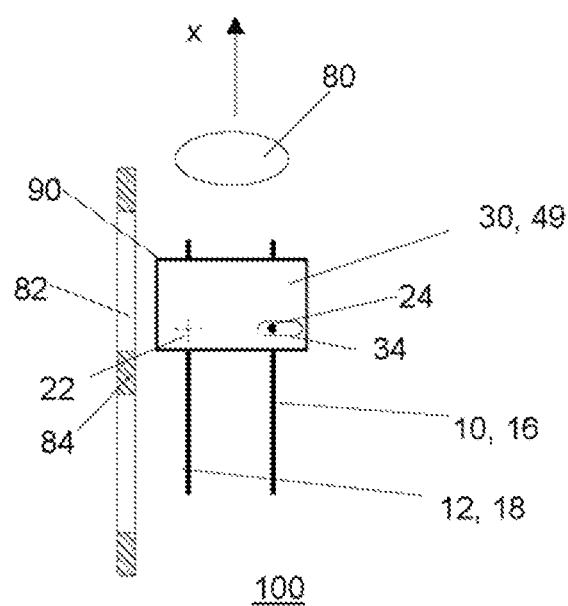
FIG. 6 is a schematic view of a vehicle seat in the initial position.
Figure 7:
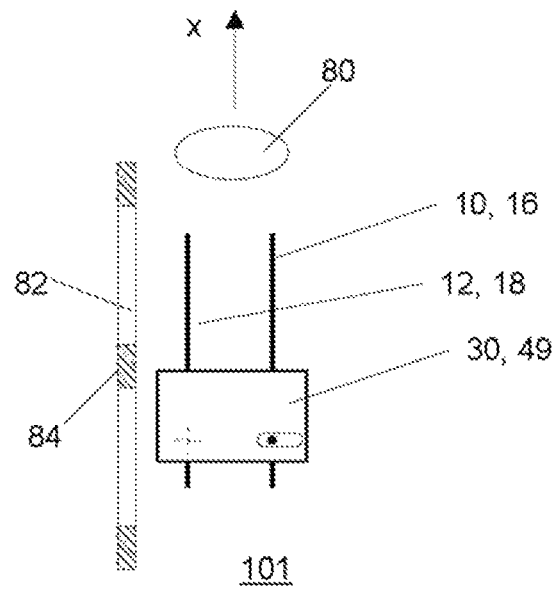
FIG. 7 is a schematic view of a vehicle seat in the starting position.
Figure 8:
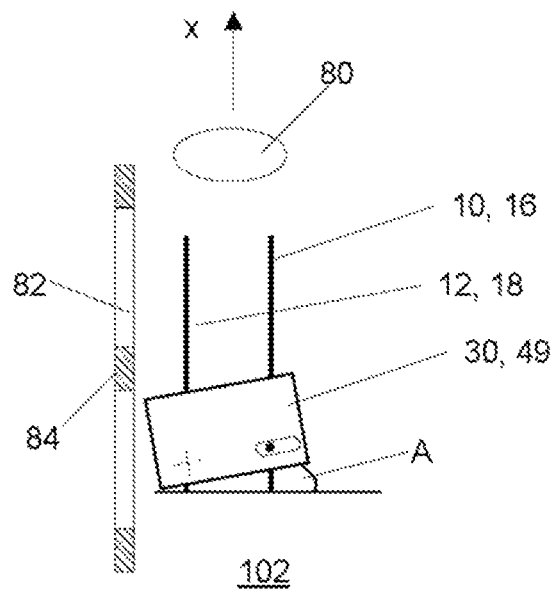
FIG. 8 is a schematic view of a vehicle seat in the intermediate position.
Figure 9:
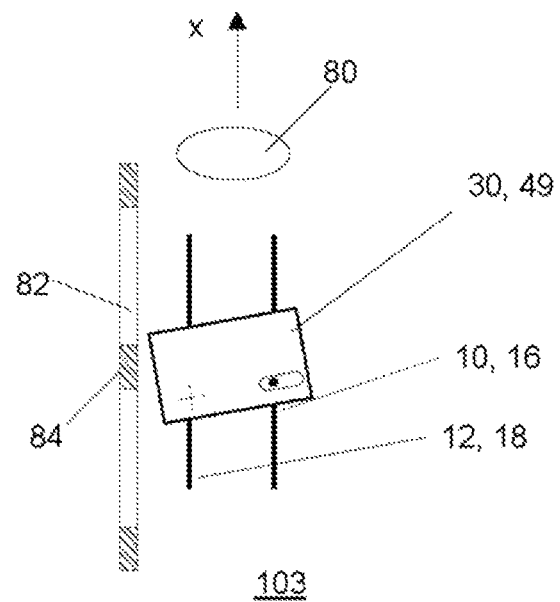
FIG. 9 is a schematic view of a vehicle seat in a first central position.
Figure 10:
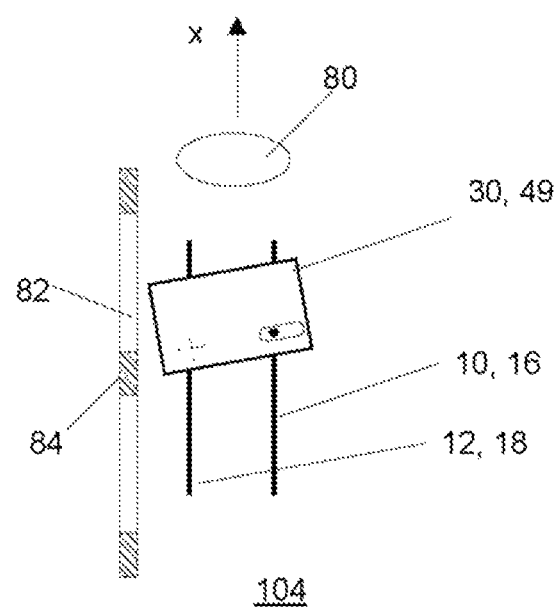
FIG. 10 is a schematic view of a vehicle seat in a second central position.
Figure 11:
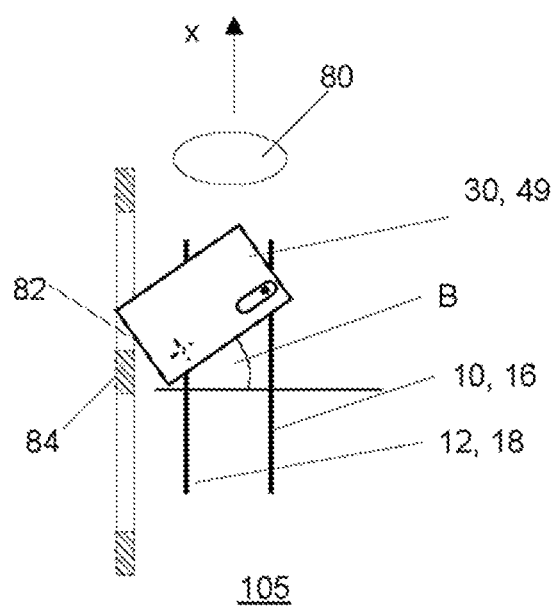
FIG. 11 is a schematic view of a vehicle seat in the end position.

The motors 40, 42 are able to be actuated independently of one another by means of a control unit 70 shown in FIG. 5.

It is also conceivable to provide just one motor for driving the two upper rails 16, 18. In this case, one respective coupling which is able to be connected and disconnected is provided for each upper rail 16, 18, wherein the motor and said couplings are able to be actuated by the control unit 70.

In FIG. 3 a known vehicle seat is shown in the position of use. In the exemplary embodiment shown here, said seat is a vehicle seat of a left-hand drive vehicle. The longitudinal direction x defined by the lower rails 10, 12 corresponds in this case at least approximately to the direction of travel.

A seat cushion 44 is fastened to the supporting plate 30, said seat cushion having a front end 46 in the longitudinal direction x and a rear end 48 in the longitudinal direction x. A backrest 50 is arranged in the region of the rear end 48 of the seat cushion 44. The seat cushion 44 and the backrest 50 form the seat shell 49. In the position of use, the front end 46 of the seat cushion 44 faces approximately in the direction of travel and the rear end 48 of the seat cushion 44 faces approximately counter to the direction of travel.

A movement of an upper rail 16, 18 in the direction of the front end 46 of the seat cushion 44 thus corresponds to a movement approximately in the direction of travel and is denoted hereinafter as the forward movement. A movement of an upper rail 16, 18 in the direction of the rear end 48 of the seat cushion 44 corresponds to a movement approximately counter to the direction of travel and is denoted hereinafter as the rearward movement.

In the selected exemplary embodiment, the first upper rail 16 and the first lower rail 10 viewed in the direction of travel are located to the right of the second upper rail 18 and the second lower rail 12. The first upper rail 16 and the first lower rail 10 thus face the vehicle center, i.e. are arranged on the tunnel side in the transverse direction y. The second upper rail 18 and the second lower rail 12 face a driver's door as well as a vehicle body, i.e. are arranged on the sill side in the transverse direction y.

By a displacement of the first upper rail 16 relative to the first lower rail 10 in the forward direction, with the simultaneous fixing of the second upper rail 18 relative to the second lower rail 12, the supporting plate 30 undergoes a rotation about an axis extending in the vertical direction and namely counterclockwise. The seat cushion 44 and the backrest 50 undergo the same rotation, whereby the front end 46 of the seat cushion 44 moves toward the driver's door.

In this rotated position of the vehicle seat which is shown in FIG. 4, it is possible for the driver to enter the vehicle onto the driver's seat in a simple manner.

The counterclockwise rotation of the vehicle seat described here is naturally also able to be implemented by other movements of the upper rails 16, 18, for example by a displacement of the second upper rail 18 in the rearward direction with the simultaneous fixing of the first upper rail 16 and by the simultaneous displacement of the first upper rail 16 in the forward direction and the second upper rail 18 in the rearward direction.

The vehicle seat is rotated counterclockwise when the first upper rail 16 is moved in the forward direction relative to the second upper rail 18.

A simultaneous displacement of the first upper rail 16 in the forward direction and the second upper rail 18 in the rearward direction additionally brings the advantage that the described rotated position from the position of use is reached in the minimum time.

The substructure shown in FIG. 1 and FIG. 2 is only suitable for a counterclockwise rotation from the position of use, due to the arrangement and the dimensions of the recesses, in particular the second recess 36 and the third recess 38.

For implementing a clockwise rotation of a vehicle seat from the position of use, which is desired for example for a front passenger seat, the supporting plate 30 may be designed mirror-symmetrically.

The vehicle seat is rotated clockwise when the first upper rail 16 is moved relative to the second upper rail 18 in the rearward direction.

The vehicle seat may also be designed so that both a clockwise rotation and a counterclockwise rotation from the position of use are possible.

In the substructure shown in FIG. 1 and FIG. 2, in the position of use the second pin 26 bears against one end of the second recess 36 and the third pin 28 bears against one end of the third recess 38. By the design of the second recess 36 and the third recess 38 such that in the position of use the second pin 26 is located in a central region of the second recess 36 and the third pin 38 is located in a central region of the third recess 38, both a clockwise rotation and a counterclockwise rotation of the vehicle seat from the position of use are possible.

By a clockwise rotation of a driver's seat, the rear end 48 of the seat cushion 44 moves closer to the driver's door. In this position of the vehicle seat, it is possible for a passenger to enter the vehicle onto a rear seat located behind the driver's seat in a simple manner.

Similarly, by a counterclockwise rotation of a front passenger seat, it is possible for a passenger to enter the vehicle onto a rear seat located behind the front passenger seat in a simple manner.

Similarly, by a corresponding rotation of a vehicle seat arranged in a second seat row, it is possible for a passenger to enter the vehicle onto a vehicle seat located in a third seat row in a simple manner.

In a further alternative embodiment, not shown, the second pin 26 and/or the third pin 28 are dispensed with. An alternative supporting plate which bears against the upper rails 16, 18 and is fastened thereto comprises a bore 32 and a first recess 34, similar to the supporting plate 30 known from FIG. 1. In this case, the pivot pin 22 protrudes through the bore 32 and the first pin 24 protrudes through the first recess 34.

Preferably, in this case a bearing is provided, said bearing supporting the alternative supporting plate in the vertical direction. Such a bearing is, for example, designed as a rolling bearing and comprises a roller which is rotatably mounted on the second upper rail 18 about an axis extending in the longitudinal direction x. The bearing may also be designed as a ball bearing or a friction bearing.

In FIG. 5 a control system for controlling the vehicle seat is shown schematically.

The control unit 70 contains, amongst other things, a sequence control unit for carrying out the method according to the invention.

By means of an operating unit 72, said sequence control unit is able to be selected by a vehicle occupant, in particular the driver. The operating unit 72 comprises, for example, a plurality of switches or is designed as a touchscreen. The operating unit 72 may also comprise a display unit which shows the current position of the vehicle seat.

The operating unit 72 transmits corresponding control signals to the control unit 70. The control unit 70 in the present case is designed as a separate control device. The control unit may also be integrated in a further control device or a further control system of the vehicle. As already mentioned, the control unit 70 actuates the first motor 40 and the second motor 42 independently of one another.

In particular, it is also conceivable for each of the motors 40, 42 to have a separate motor control system. Said motor control systems in this case contain the sequence control unit for carrying out the method according to the invention and are preferably arranged in the vicinity of the respective motor 40, 42, in particular in the respective motor housing. The motor control systems and/or the motors 40, 42 thus also use communication interfaces, for example a CAN-bus or LIN-bus, by means of which it is possible to exchange data with one another, with the operating unit 72 and/or with further control systems of the vehicle.

A first position detection unit 74 detects the position of the first upper rail 16 relative to the first lower rail 10 and transmits a corresponding signal to the control unit 70. A second position detection unit 76 also detects the position of the second upper rail 18 relative to the second lower rail 12 and transmits a corresponding signal to the control unit 70.

Each of the position detection units 74, 76 comprises in the present case one respective sensor which determines the current position of the associated upper rail 16, 18 as an analogue or digital value. The position detection units 74, 76 may also be integrated in the respectively associated motor 40, 42, wherein for example the current position of the corresponding upper rail 16, 18 is calculated by counting the revolutions of the corresponding motor 40, 42.

It is also conceivable for a position detection unit 74, 76 to comprise a plurality of separate sensors, wherein each sensor simply detects a definable position of the associated upper rail 16, 18.

A plurality of positions from the movement sequence of a vehicle seat according to the method according to the invention are shown in FIG. 6 to FIG. 11. In this case, the seat shell 49 is automatically moved from an initial position 100 into an end position 105, in which it is possible for the driver to enter the vehicle and exit the vehicle in a simple manner.

The initial position 100 corresponds in this case to the position of use, which the driver has set for driving the vehicle, as also shown in FIG. 3. In the end position 105 the seat shell 49 of the vehicle seat is located relatively far forward in the longitudinal direction x and is rotated relative to the initial position 100 about the vertical axis, as also shown in FIG. 4.

A steering wheel 80 is located in the direction of travel in front of the seat shell 49 which is fastened to the supporting plate 30. Parts of a vehicle body comprising a B-pillar 84 and a door opening 82 are arranged in a known manner to the left in the direction of travel, i.e. on the sill side.

For the detailed description of said movement sequence, a reference point 90 is defined which in this example is located on the front corner of the supporting plate 30 on the sill side in the direction of travel x.

Starting from the initial position 100, the two motors 40, 42 are actuated such that the seat shell 49 is displaced in a straight line in the longitudinal direction x to a starting position 101. The starting position 101 is located in this case relatively far to the rear in the direction of travel.

When reaching the starting position 101, the first motor 40 on the tunnel side is stopped whilst the second motor 42 on the sill side continues to operate until an intermediate position 102 is reached. In the intermediate position 102 the seat shell 49 is rotated relative to the starting position 101 by a first angle A about the axis extending vertically through the pivot pin 22.

The first angle A is in this case approximately the largest possible angle where a collision of the seat shell 49 and the supporting plate 30 with the B-pillar 84 of the vehicle body is avoided. The first angle A in the present case is within the range of 8° to 12°, preferably 10°.

After reaching the intermediate position 102, the two motors 40, 42 are actuated such that the seat shell 49 is displaced forward in a straight line in the longitudinal direction x as far as a first central position 103. The first central position 103 is located in the direction of travel in front of the intermediate position 102.

According to a first variant of the method, when the first central position 103 is reached, the two motors 40, 42 are actuated again so that the seat shell 49 is displaced further forward in a straight line in the longitudinal direction x as far as a second central position 104. The second central position 104 is located in this case relatively far forward in the direction of travel, before the first central position 103. According to the first variant, therefore, the seat shell 49 moves through the first central position 103 and reaches the second central position 104.

When the second central position 104 is reached, the second motor 42 on the sill side is stopped whilst the first motor 40 on the tunnel side continues to operate until the end position is reached 105. As a result, the seat shell 49 is rotated further. Then the first motor 40 on the tunnel side is also stopped.

According to a second variant of the method, when the first central position 103 is reached, the second motor 42 on the sill side is decelerated whilst the first motor 40 on the tunnel side continues to operate at the same speed until the end position 105 is reached. As a result, the seat shell 49 is rotated further and at the same time pushed forward in the longitudinal direction x. Then the two motors 40, 42 are stopped. According to the second variant, therefore, the second central position 104 is not reached.

According to both described variants the seat shell 49, therefore, reaches the same end position 105. In the end position 105 the seat shell 49 is rotated relative to the starting position 101 by a second angle B about the axis running vertically through the pivot pin 22. The second angle B in the present case is within the range of 40° to 50°, preferably 45°.

In the example selected here, the position of use selected by the driver, i.e. the initial position 100, is located in front of the starting position 101 in the direction of travel. The seat shell 49 is thus initially displaced to the rear.

In a specific case, the position of use selected by the driver is located behind the starting position 101 in the direction of travel. Such a position of use is denoted hereinafter as the rear starting position 106. In this case, the two motors 40, 42 are actuated such that the seat shell 49 is initially displaced forward in a straight line in the longitudinal direction x as far as the starting position 101.

Advantageously in this case, however, the motors 40, 42 are actuated such that the seat shell 49 is now rotated out of the rear starting position 106 into the intermediate position 102 described above. To this end, the motors 40, 42 are actuated such that the second motor 42 on the sill side drives the seat shell 49 to the rear in the longitudinal direction x, whilst the first motor 40 on the tunnel side drives the seat shell 49 forward in the longitudinal direction x until the intermediate position 102 is reached.

In a further specific case, the position of use selected by the driver may correspond exactly to the starting position 101. In this case, the longitudinal displacement of the seat shell 49 from the initial position into the starting position 101 is dispensed with.

Figure 12:
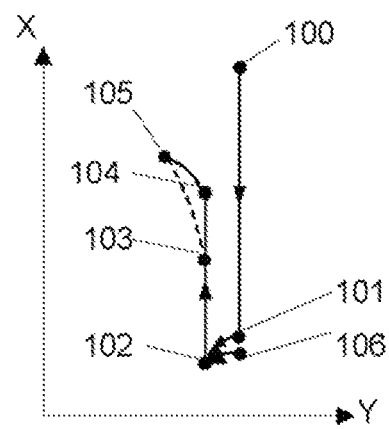
FIG. 12 is a movement profile of a defined measuring point of the vehicle seat.

A movement profile of the defined reference point 90 during the movement sequence of the vehicle seat described here is shown in FIG. 12.

Starting from a position of use selected by the driver, which is located in front of the starting position 101 in the direction of travel and is denoted as the initial position 100, the reference point 90 moves in the longitudinal direction x to the rear until the starting position 101 is reached.

During the following rotation by the first angle A, in the selected example counterclockwise, the reference point 90 moves further to the rear in the longitudinal direction x and to the left in the transverse direction y, i.e. toward the vehicle body, until the intermediate position 102 is reached.

Subsequently, the reference point 90 moves forward again in the longitudinal direction x until the first central position 103 is reached.

According to the described first variant of the method which is illustrated as a continuous line in the movement profile shown, the reference point 90 passes through the first central position 103 and reaches the second central position 104.

During the following further rotation by the second angle B, in the selected example counterclockwise, the reference point 90 moves further forward in the longitudinal direction x and in the transverse direction y further to the left until the end position 105 is reached.

According to the described second variant of the method which is illustrated in the movement profile shown as an interrupted line, the reference point 90 moves further forward from the first central position 103 in the longitudinal direction x and in the transverse direction y further to the left until the same end position 105 is reached.

The described specific case is also shown in the movement profile, in which the position of use selected by the driver corresponds to the rear starting position 106. The reference point 90 in this case advantageously moves at the same time in the longitudinal direction x to the rear and in the transverse direction y to the left until the aforementioned intermediate position 102 is reached.

The control unit 70 also contains a further sequence control for carrying out further method steps for the automatic movement of the seat shell 49 from the end position 105 back into the previously set position of use. This further sequence control may also be selected by means of the operating unit 72.

In this case, at the start of the method according to the invention the set position of use is stored, i.e. the initial position 100 and/or the rear starting position 106. The aforementioned further method comprises the steps described above in reverse sequence and in reverse directions. The seat shell 49 in this case is automatically moved back into the previously stored position of use.

In a vehicle, the steering wheel 80 thereof also being provided with an adjusting drive, the steering wheel 80 may be moved away from the seat shell 49 in the longitudinal direction x and/or upwardly in the vertical direction during the described movement sequence. In particular, said movement of the steering wheel 80 may take place during the rotation of the seat shell 49 by the first angle A.

In this case, the steering wheel 80 or the adjusting drive thereof uses a communication interface for exchanging data with the control system 70 or the motor control systems of the motors 40, 42.

Optionally, a foot rest or lower leg support is able to be attached to the supporting plate 30 or the seat shell 49, whereby the feet of the driver are automatically lifted over the sill.

A similar improvement results when the sill is designed to be foldable. Advantageously, the folding of the sill is integrated in the movement sequence of the method according to the invention.

While specific embodiments of the invention have been shown and described in detail to illustrate the application of the principles of the invention, it will be understood that the invention may be embodied otherwise without departing from such principles.

The invention claimed is:

1. A method for controlling a longitudinally adjustable and rotatable vehicle seat which seat comprises a first upper rail movably guided in a first lower rail, a second upper rail movably guided in a second lower rail, a seat shell, a first motor for driving the first upper rail and a second motor for driving the second upper rail wherein by means of an aligned displacement of the upper rails relative to the lower rails the seat shell is displaced in a straight line and by means of a displacement of the first upper rail relative to the second upper rail the seat shell undergoes a rotation about a vertical axis, the method comprising the steps of:
    displacing the seat shell rearwardly in a straight line from an initial position into a starting position by moving the first upper rail via the first motor and moving the second upper rail via the second motor;
    rotating the seat shell, by a first angle, from the starting position into an intermediate position by moving the first upper rail via the first motor to provide a rotated seat shell;
    displacing the rotated seat shell in a straight line forwardly in the direction of travel into a first central position by moving the first upper rail via the first motor and moving the second upper rail via the second motor wherein during displacing the rotated seat shell in a straight line forwardly, the seat shell remains in a rotated orientation; and
    rotating the rotated seat shell by a second angle into an end position by at least moving the first upper rail via the first motor.

2. The method as claimed in claim 1, wherein the initial position is located in front of the starting position with respect to a direction of travel, wherein the seat shell is displaced into the first central position after the seat shell is rotated by the first angle, the seat shell being rotated by the second angle after said the seat shell is displaced into said first central position, the first central position being located in front of the intermediate position with respect to the direction of travel.

3. The method as claimed in claim 1, wherein the seat shell is moved back from the end position into the initial position, wherein the rotated seat shell is rotated by the second angle into the end position after the rotated seat shell is moved to the first central position.

4. The method as claimed in claim 1, wherein the first motor is stopped during the rotation by the first angle.

5. The method as claimed in claim 1, wherein the seat shell is displaced in a straight line from the first central position until the second central position is reached, and the seat shell is subsequently rotated by the second angle until the end position is reached.

6. The method as claimed in claim 5, wherein the second motor is stopped during the rotation by the second angle.

7. The method as claimed in claim 1, wherein the seat shell is rotated from the first central position by the second angle and at the same time displaced in a straight line until the end position is reached.

8. The method as claimed in claim 7, wherein during the rotation by the second angle the second motor operates at a reduced speed in comparison with at least one of the operational speed of the second motor during the step of displacing the seat shell in a straight line in the direction of travel into the first central position and a speed of the first motor.

9. The method as claimed in claim 1, wherein a steering wheel is moved away from the seat shell in the longitudinal direction via an adjusting drive.

10. The method as claimed in claim 9, wherein during the rotation by the first angle the steering wheel is moved away from the seat shell in the longitudinal direction via said adjusting drive.

11. A longitudinally adjustable and rotatable vehicle seat control method comprising:
    providing a vehicle seat comprising a first upper rail movably guided in a first lower rail, a second upper rail movably guided in a second lower rail, a seat shell, a first motor for driving the first upper rail and a second motor for driving the second upper rail;
    displacing the seat shell rearwardly in a straight line from an initial position into a starting position by moving the first upper rail via the first motor and moving the second upper rail via the second motor;
    rotating the seat shell, by a first angle, from the starting position into an intermediate position by moving the first upper rail via the first motor to provide a rotated seat shell;
    displacing the rotated seat shell in a straight line forwardly in the direction of travel into a first central position by moving the first upper rail via the first motor and moving the second upper rail via the second motor wherein during displacing the rotated seat shell in a straight line forwardly, the seat shell remains in a rotated orientation; and rotating the rotated seat shell by a second angle into an end position by at least moving the first upper rail via the first motor.

12. The method as claimed in claim 11, wherein the initial position is located in front of the starting position with respect to a direction of travel, the seat shell being displaced into the first central position after the seat shell is rotated by the first angle, the seat shell being rotated by the second angle after the seat shell is rotated by the first angle and after the seat shell is displaced into said first central position, the first central position being located in front of the intermediate position with respect to the direction of travel.

13. The method as claimed in claim 11, wherein the seat shell is moved back from the end position into the initial position, wherein the rotated seat shell is rotated by the second angle into the end position after the rotated seat shell is moved to the first central position.

14. The method as claimed in claim 11, wherein the first motor is stopped during the rotation by the first angle.

15. The method as claimed in claim 11, wherein the seat shell is displaced in a straight line from the first central position until the second central position is reached, and the seat shell is subsequently rotated by the second angle until the end position is reached.

16. The method as claimed in claim 15, wherein the second motor is stopped during the rotation by the second angle.

17. The method as claimed in claim 11, wherein the seat shell is rotated from the first central position by the second angle and at the same time displaced in a straight line until the end position is reached.

18. The method as claimed in claim 17, wherein during the rotation by the second angle the second motor operates at reduced speed in comparison with at least one of the operational speed of the second motor during the step of displacing the seat shell in a straight line in the direction of travel into the first central position and a speed of the first motor.

19. The method as claimed in claim 1, wherein at the same time a steering wheel is moved away from the seat shell in the longitudinal direction via an adjusting drive.

20. The method as claimed in claim 19, wherein during the rotation by the first angle the steering wheel is moved away from the seat shell in the longitudinal direction via said adjusting drive.

* * * * *